US010264526B2

(12) United States Patent
Sukhija et al.

(10) Patent No.: US 10,264,526 B2
(45) Date of Patent: Apr. 16, 2019

(54) ADAPTIVE TIM SETUP POLICY FOR CLIENT DEVICES IN POWER-SAVE MODE IN DENSE ENVIRONMENT

(71) Applicant: MediaTek Singapore Pte. Ltd., Singapore (SG)

(72) Inventors: Vikas Sukhija, Bhiwani (IN); Vinay Garg, Ghaziabad (IN); Soumik Das, Noida (IN)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 0 days.

(21) Appl. No.: 15/615,907

(22) Filed: Jun. 7, 2017

(65) Prior Publication Data
US 2017/0272974 A1   Sep. 21, 2017

(51) Int. Cl.
*H04W 52/02* (2009.01)
*H04W 72/12* (2009.01)
*H04W 76/20* (2018.01)

(52) U.S. Cl.
CPC ... *H04W 52/0219* (2013.01); *H04W 52/0216* (2013.01); *H04W 72/1289* (2013.01); *H04W 76/20* (2018.02); *H04W 72/1242* (2013.01); *H04W 72/1273* (2013.01); *Y02D 70/142* (2018.01); *Y02D 70/21* (2018.01); *Y02D 70/26* (2018.01)

(58) Field of Classification Search
CPC ......... H04W 52/0216; H04W 52/0219; H04W 72/1289; H04W 76/20
See application file for complete search history.

(56) References Cited

U.S. PATENT DOCUMENTS

| 2005/0152324 | A1* | 7/2005 | Benveniste | H04W 28/10 370/338 |
| 2005/0197148 | A1* | 9/2005 | Ali | H04W 28/16 455/522 |
| 2007/0058605 | A1* | 3/2007 | Meylan | H04W 72/0406 370/346 |

(Continued)

FOREIGN PATENT DOCUMENTS

TW     201401824 A     1/2014

OTHER PUBLICATIONS

Taiwan Intellectual Property Office, Office Action for Taiwan Patent Application No. 107118358, dated Jan. 11, 2019.

*Primary Examiner* — Gary Mui
(74) *Attorney, Agent, or Firm* — Han IP PLLC; Andy M. Han

(57) ABSTRACT

Examples pertaining to adaptive traffic indication map (TIM) setup policy for client devices in power-save mode in a dense environment are provided. An apparatus may determine an amount of available time for access to a transmission medium. The apparatus (e.g., access point) may select a subset of one or more communication devices from a plurality of communication devices (e.g., client devices) associated with the apparatus based at least in part on the amount of available time. The apparatus may also signal to the selected subset of the one or more communication devices to cause the one or more communication devices to switch from a first mode to a second mode. The apparatus may further transmit buffered data to at least one communication device of the subset of one or more communication devices during the available time.

18 Claims, 9 Drawing Sheets

(56) References Cited

U.S. PATENT DOCUMENTS

| | | | |
|---|---|---|---|
| 2012/0063394 A1* | 3/2012 | Shiotani | H04W 52/0216 370/329 |
| 2012/0263084 A1* | 10/2012 | Liu | H04W 52/0216 370/311 |
| 2012/0320881 A1* | 12/2012 | Hong | H04B 7/2646 370/336 |
| 2015/0043402 A1* | 2/2015 | Park | H04W 52/0216 370/311 |
| 2015/0103767 A1 | 4/2015 | Kim et al. | |
| 2015/0124784 A1* | 5/2015 | Choi | H04W 74/04 370/336 |
| 2016/0021680 A1* | 1/2016 | Choi | H04W 52/0216 370/311 |
| 2016/0037559 A1* | 2/2016 | Malik | H04W 74/08 370/329 |

\* cited by examiner

ADAPTIVE TIM SETUP POLICY FOR CLIENT DEVICES IN POWER-SAVE MODE IN DENSE ENVIRONMENT

TECHNICAL FIELD

The present disclosure is generally related to wireless communications and, more particularly, to adaptive traffic indication map (TIM) setup policy for client devices in power-save mode in a dense environment.

BACKGROUND

Unless otherwise indicated herein, approaches described in this section are not prior art to the claims listed below and are not admitted to be prior art by inclusion in this section.

As per the Institute of Electrical and Electronics Engineers (IEEE) 802.11 specification, an access point (AP) needs to set the TIM bit in the TIM information element (IE) of the beacon frame for all client devices in power-save mode for which the AP has buffered data. In a dense environment with a significant number of client devices in power-save mode, however, this approach is not efficient especially when the AP has management protocol data units (MPDU) for a majority of the client devices in power-save mode. This is because, in a dense environment having a large number of client devices in power-save mode, issues such as high rate of frame collision, inefficient medium utilization and large power consumption tend to occur. For instance, upon receiving the beacon frame, the devices would contend for access to the medium at the same time to retrieve the buffered data, thus resulting in high frame collision rate. Additionally, due to high frame collision rate, back-off time and the number of retries increase for at least some of the devices contending for access to the medium, thus resulting in inefficient medium usage. Moreover, as beacon interval is not sufficient to serve all the devices in power-save mode, may devices may stay awake while receiving no data frame in a given beacon interval, thus leading to large power consumption.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose a novel scheme or policy for adaptive setup of TIM for devices in power-save mode in a dense environment. Advantageously, it is believed the proposed scheme can mitigate or otherwise address aforementioned issues associated with the existing approach.

In one aspect, a method may involve a processor of an apparatus determining an amount of available time for access to a transmission medium. The method may also involve the processor selecting a subset of one or more communication devices from a plurality of communication devices associated with the apparatus based at least in part on the amount of available time. The method may further involve the processor signaling to the selected subset of the one or more communication devices to cause the one or more communication devices to switch from a first mode to a second mode.

In another aspect, an apparatus may include a memory and a processor. The memory may store one or more sets of instructions. The processor may be communicatively coupled to the memory to execute the one or more sets of instructions such that, upon execution of the one or more sets of instructions, the processor performs acts including: determining an amount of available time for access to a transmission medium; selecting a subset of one or more communication devices from a plurality of communication devices associated with the apparatus based at least in part on the amount of available time; and signaling to the selected subset of the one or more communication devices to cause the one or more communication devices to switch from a first mode to a second mode.

It is noteworthy that, although description of the proposed scheme and various examples is provided below in the context of wireless communications in accordance with the IEEE 802.11 specification, the proposed scheme and any variation(s)/derivative(s) thereof may be implemented in communications in accordance with other protocols, standards and specifications where implementation is suitable. Thus, the scope of the proposed scheme is not limited to the description provided herein.

BRIEF DESCRIPTION OF THE DRAWINGS

The accompanying drawings are included to provide a further understanding of the disclosure, and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Under the proposed scheme of the present disclosure, the AP does not set the TIM bit in the TIM information element (IE) at a given target beacon transmission time (TBTT) for all devices capable of being in power-save mode that have buffered data at the AP. That is, the proposed scheme provides an adaptive approach to dynamically set the TIM bit to address aforementioned issues associated with the existing approach. Various features and aspects with respect to the proposed scheme are described below with reference to each of FIG. 1-FIG. 6.

Figure 1:
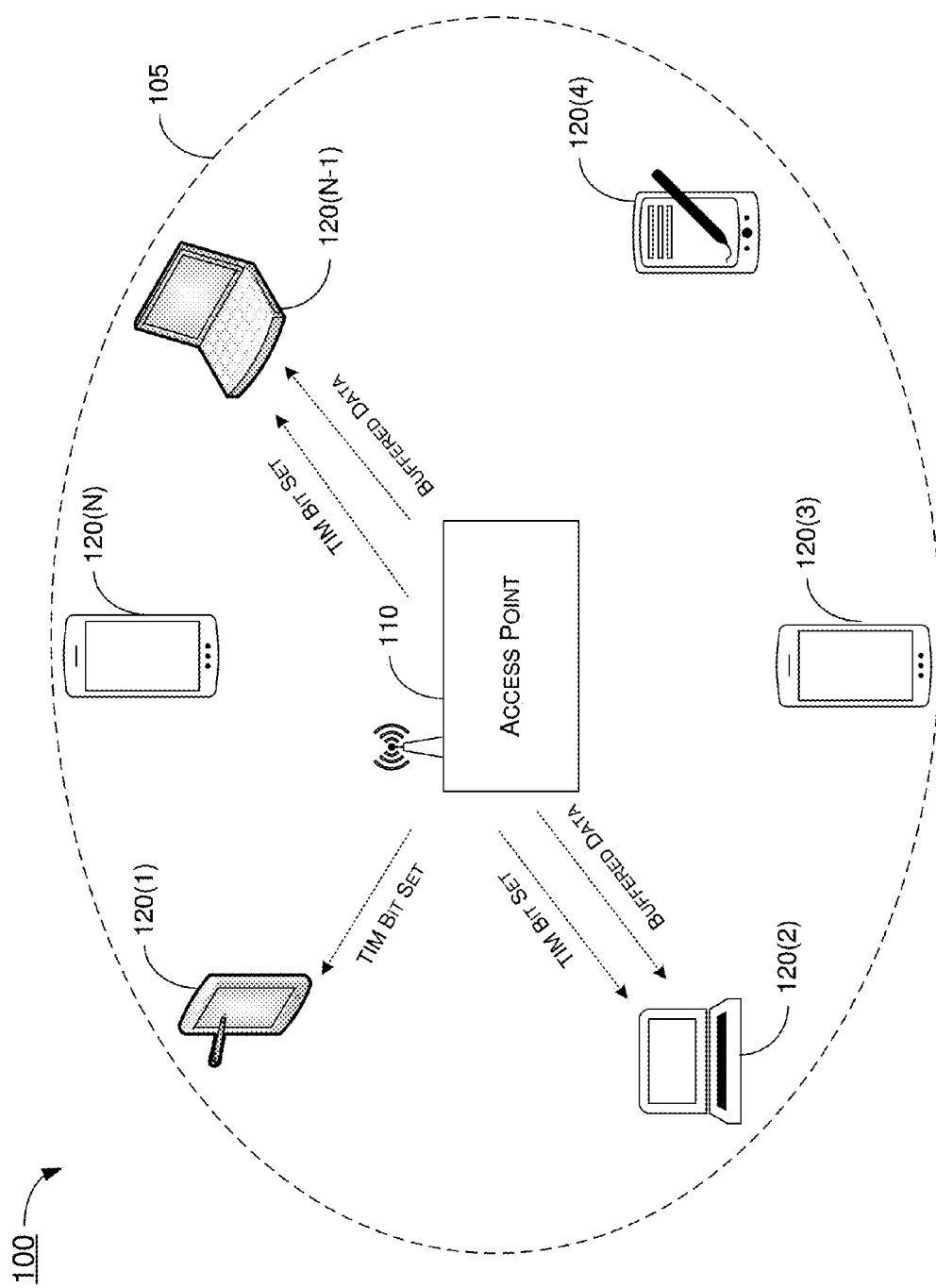
FIG. 1 is a diagram of an example networking environment in which embodiments in accordance with the present disclosure may be implemented.

FIG. 1 illustrates an example networking environment 100 in which embodiments in accordance with the present disclosure may be implemented. Networking environment 100 represents a dense environment with a large number of communication devices. Referring to FIG. 1, in networking environment 100 a number of communication devices 120(1)-120(N) (e.g., networking devices or stations), with N being a positive integer, are associated with an access point 110, or AP 110, in a wireless local area network (WLAN) and may form a basic service set (BSS) 105. That is, each of communication devices 120(1)-120(N) may be actively engaged in wireless communications (e.g., receiving and transmitting data) with AP 110 in accordance with the IEEE 802.11 specification at any given point in time. AP 110 may be an access point, a software-enabled access point, or a virtual router.

At any given time, one or more of the communication devices 120(1)-120(N) may be active (e.g., staying "awake" or in a normal mode) while one or more others may be inactive (e.g., staying "asleep" or in a power-save (PS) mode), as the inactive one(s) may have no data to transmit to AP 110 and being in power-save mode helps minimize power consumption. That is, each of communication devices 120(1)-120(N) (hereinafter interchangeably referred as "PS-capable devices" and "power-save devices") may be capable of entering a respective type of power-save mode. Thus, AP 110 may be able to determine whether each individual one of communication devices 120(1)-120(N) is active or inactive in accordance with the IEEE 802.11 specification. In the example shown in FIG. 1, communication devices 120(1), 120(2) and 120(N−1) are inactive with data buffered at AP 110 while STAs 120(3), 120(4) and 120(N) are active with no data communication at the depicted point in time. In other words, AP 110 may identify communication devices 120(1), 120(2) and 120(N−1) as a subset of communication devices 120(1)-120(N) and as inactive communication devices, with each of STAs 120(1), 120(2) and 120(N−1) actively engaged in communications with AP 110, while STAs 120(3), 120(4) and 120(N) are not actively engaged in communications with AP 110 (e.g., as each of STAs 120(3), 120(4) and 120(N) may be in the active or normal mode).

Under the proposed scheme, AP 110 may dynamically set the TIM bit for some but not all of communication devices 120(1)-120(N). Specifically, AP 110 may calculate or otherwise determine an amount of time that a transmission medium is available for use (e.g., for AP 110 to transmit data). AP 110 may select a subset of communication devices from communication devices 120(1)-120(N) that can be served easily during the available time. AP 110 may then set the TIM bit for each of the selected one or more communication devices, which are in the power-save mode. Additionally, AP 110 may delay setting the TIM bit for the remaining, unselected PS-capable communication device(s) for one or more subsequent TBTTs.

In some implementations, selection of communication devices may be based on a number of selection factors including, for example and without limitation, (1) the quality of service (QOS) of buffered data destined for the respective communication device, (2) the type of power-save mode in which the respective communication device may be in, and (3) the round robin priority associated with the respective communication device. In some implementations, the number or quantity of communication devices selected by AP 110 may be based on a number of factors including, for example and without limitation, (1) a respective last data rate of a previous data transmission to each of the one or more communication devices, and (2) the amount of buffered data destined for the selected number of communication device(s).

Figure 2:
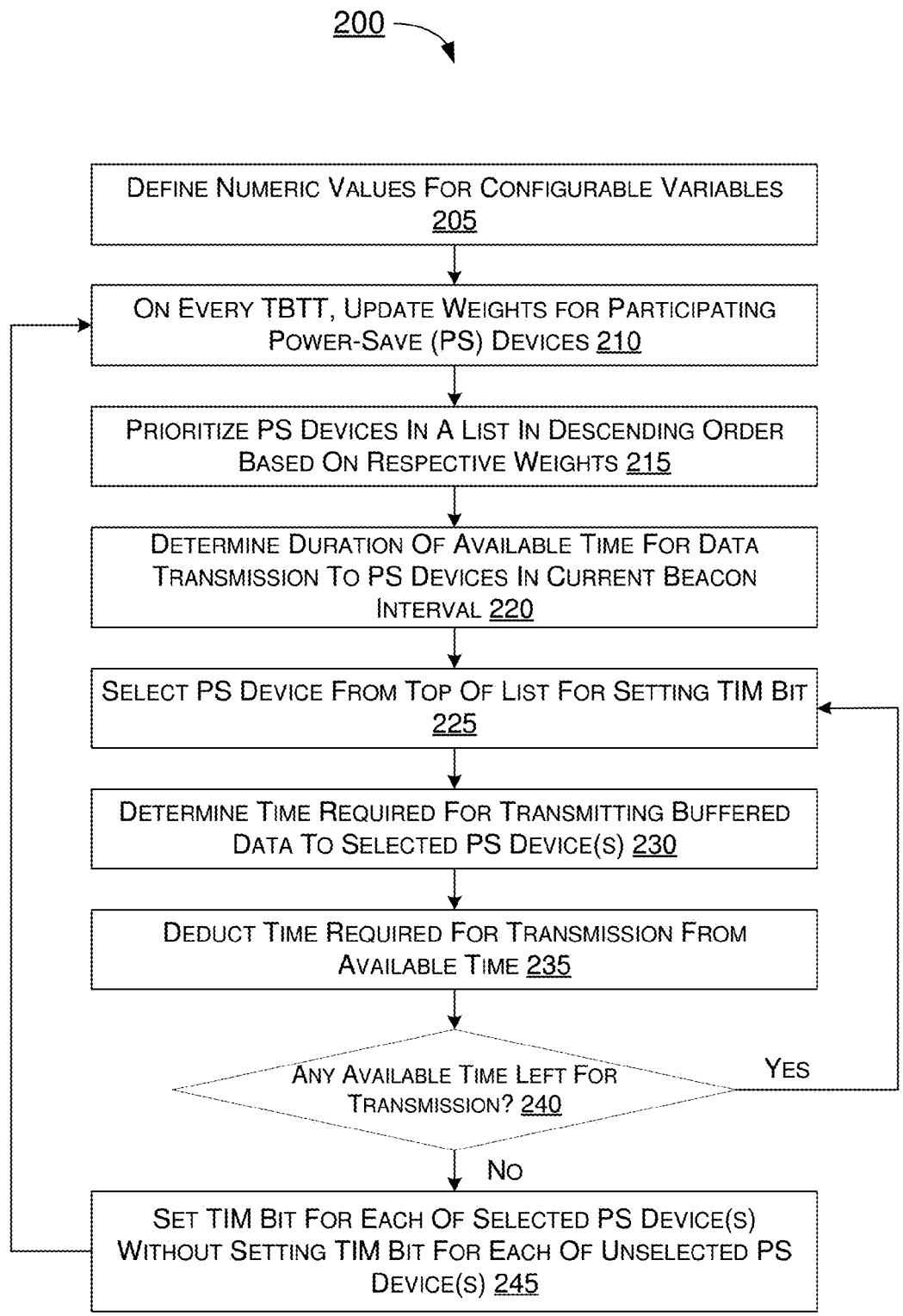
FIG. 2 is a diagram of an example algorithm in accordance with an implementation of the present disclosure.

FIG. 2 illustrates an example algorithm 200 in accordance with an implementation of the present disclosure. Algorithm 200 may be implemented in or by AP 110 in networking environment 100 to effect various features and/or aspects of the proposed scheme of the present disclosure. Algorithm 200 may include one or more operations, actions, or functions as represented by one or more of blocks 205, 210, 215, 220, 225, 230, 235, 240 and 245. Although illustrated as discrete blocks, various blocks of algorithm 200 may be divided into additional blocks, combined into fewer blocks, or eliminated, depending on the desired implementation. Algorithm 200 may be implemented by AP 110 in networking environment 100 described above as well as by apparatus 700 described below. Solely for illustrative purposes and without limiting the scope, description of algorithm 200 is provided below in the context of AP 110 in networking environment 100, although algorithm 200 may be implemented in different environments, networks and scenarios and by different APs, soft APs and virtual routers. Algorithm 200 may begin at 205.

At 205, AP 110 may define numeric values for a number of configurable variables. For instance, AP 110 may define the numeric value for each of the following configurable variables associated with each of participating power-save devices (e.g., communication devices 120(1)-120(N): weight the highest access category (hereinafter referred as "X"), weight of the highest type of power-save mode (hereinafter referred as "Y"), weight of initial round robin (hereinafter referred as "Z"), differential between two consecutive access categories (hereinafter referred as "Δx"), differential between two available types of power-save modes (hereinafter referred as "Δy"), and differential between two consecutive states of a number of states in which a communication device may be (hereinafter referred as "Δz"). Accordingly, a sum of the configurable variables/weights (hereinafter referred as "$W_{sum}$") may be assigned to or otherwise associated with each of the participating power-save devices. Algorithm 200 may proceed from 205 to 210.

At 210, on every TBTT, AP 110 may update the aforementioned weights associated with participating power-save devices, both selected and unselected ones for a given TBTT. Algorithm 200 may proceed from 210 to 215.

At 215, AP 110 may prioritize or otherwise rank participating power-save devices in a list of descending order of priority based on the respective sum of weights, or $W_{sum}$, of each device. Algorithm 200 may proceed from 215 to 220.

At 220, AP 110 may determine the duration of available time for data transmission by AP 110 to power-save devices in a current beacon interval, which is the interval between the current TBTT and the immediately subsequent and consecutive TBTT. Algorithm 200 may proceed from 220 to 225.

At 225, AP 110 may select the power-save device on the top of the list of ranked power-save devices for setting the respective TIM bit. Algorithm 200 may proceed from 225 to 230.

At 230, AP 110 may calculate or otherwise determine the time required for transmitting buffered data destined for the selected power-save device during the available time. Algorithm 200 may proceed from 230 to 235.

At 235, AP 110 may deduct the time calculated or otherwise determined in 230 from the total amount of available time to obtain an amount of remaining available time. Algorithm 200 may proceed from 235 to 240.

At 240, AP 110 may determine whether there is sufficient remaining available time for data transmission to any of the remaining power-save devices on the list (e.g., the next one in the descending order). In response to a positive determination (that there is sufficient time), algorithm 200 may proceed from 240 to 225 so select the next power-save device on the list. In response to a negative determination (that there is insufficient time), algorithm 200 may proceed from 240 to 245.

At 245, AP 110 may set the TIM bit for each of the selected one or more power-save devices without setting the TIM bit for each of the unselected power-save device(s). Algorithm 200 may repeat by proceeding from 245 to 210 as the passage of time moves from the current TBTT to the next TBTT.

Figure 3:
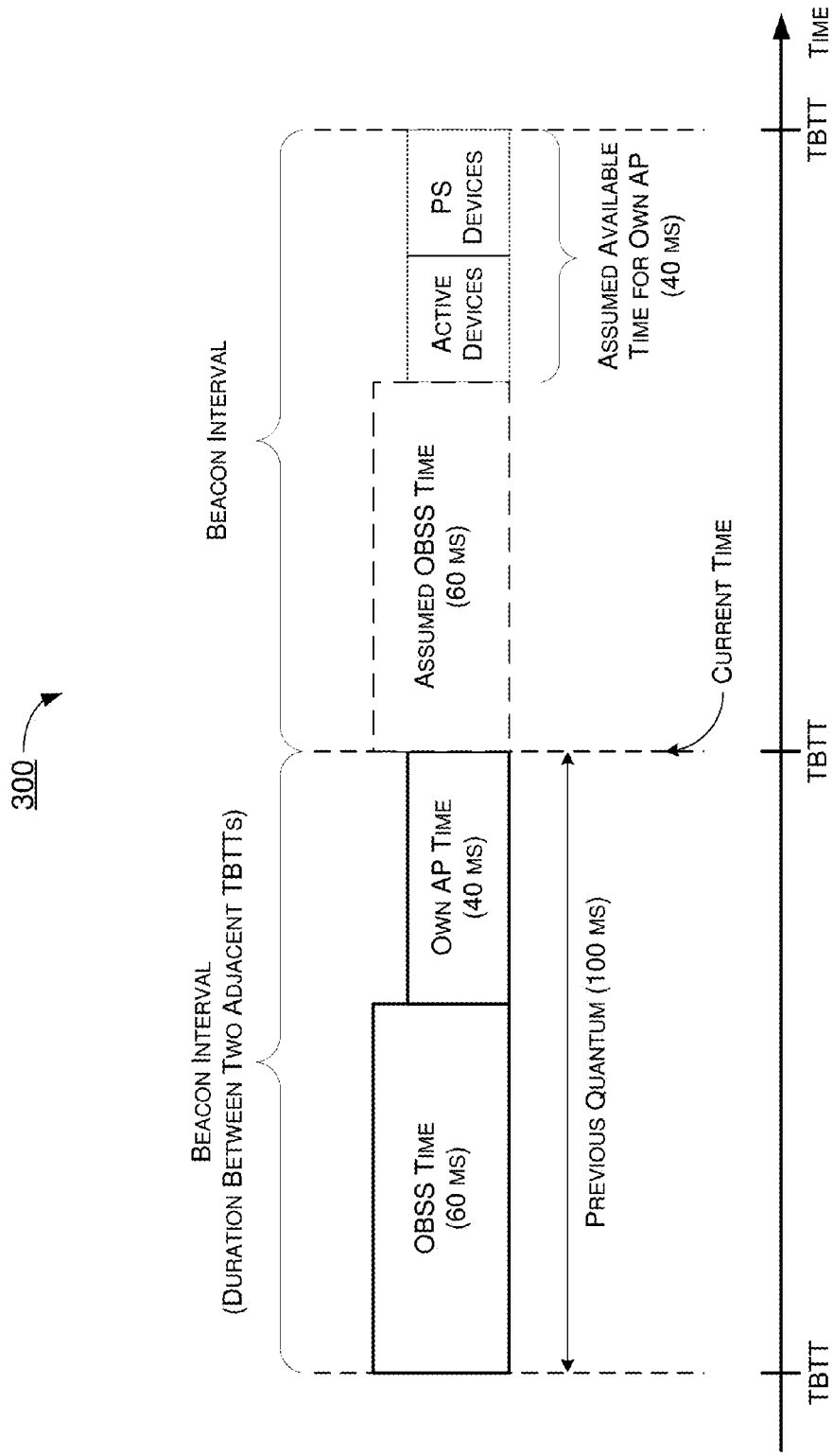
FIG. 3 is a diagram of an example scenario in accordance with an implementation of the present disclosure.

FIG. 3 illustrates an example scenario 300 in accordance with an implementation of the present disclosure. Scenario 300 may be an illustrative depiction of how available time for data transmission may be determined under the proposed scheme. Scenario 300 may be implemented by AP 110 in networking environment 100 described above as well as by apparatus 700 described below. Solely for illustrative purposes and without limiting the scope, description of scenario 300 is provided below in the context of AP 110 in networking environment 100, although scenario 300 may be implemented by different APs, soft APs and virtual routers.

Under the proposed scheme, AP 110 may calculate or otherwise determine the overlapping basic service set (OBSS) time by sensing the transmission medium for a small quantum of time such as one or two beacon intervals, where a beacon interval is the interval or duration between two consecutive TBTTs. Once the OBSS time is calculated or determined, AP 110 may assume the OBSS time will remain the same for subsequent TBTT or subsequent quantum of time. OBSS time calculation is a continuous process, used to determine OBSS time for subsequent TBTT or subsequent quantum of time In the example shown in FIG. 3, for a quantum of 100 milliseconds (ms), the available time for AP 110 to transmit data is 40 ms when the OBSS time is 60 ms. Assuming the OBSS time remains the same, AP 110 may determine that the available time for communication with active devices and power-save devices is 40 ms. AP 110 may also divide the available time between the active devices and those in respective power-save mode.

Figure 4:
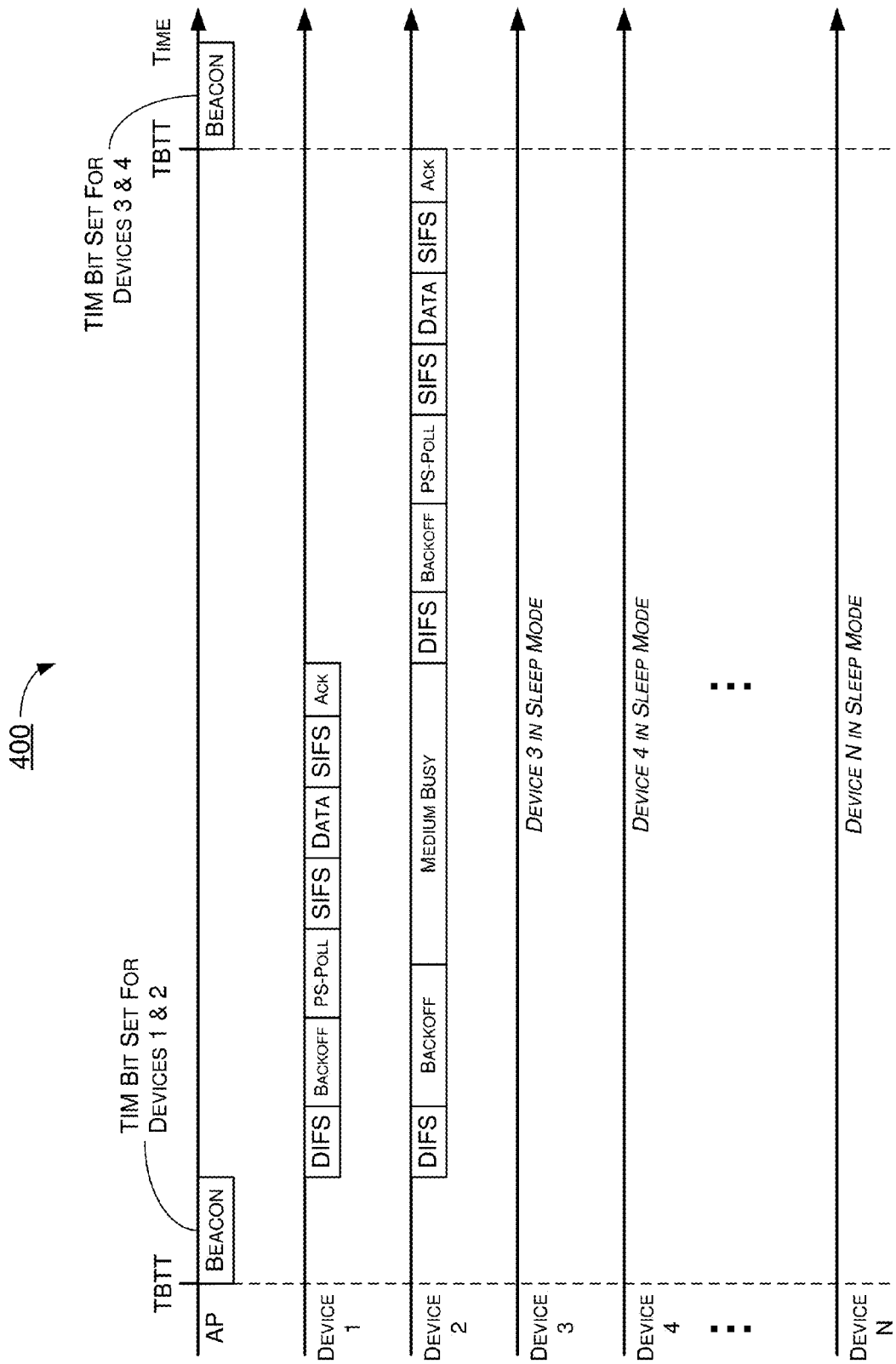
FIG. 4 is a diagram of an example scenario in accordance with an implementation of the present disclosure.

FIG. 4 illustrates an example scenario 400 in accordance with an implementation of the present disclosure. Scenario 400 may be an illustrative depiction of selection of power-save device(s) under the proposed scheme. Scenario 400 may be implemented by AP 110 in networking environment 100 described above as well as by apparatus 700 described below. Solely for illustrative purposes and without limiting the scope, description of scenario 300 is provided below in the context of AP 110 in networking environment 100, although scenario 300 may be implemented by different APs, soft APs and virtual routers.

Under the proposed scheme, AP 110 may prioritize, rank or otherwise order the power-save devices on the basis of known parameters, such as the aforementioned configuration variables or weights. AP 110 may then set the TIM bit for the power-save device(s) that can receive the respective data relatively easily in the amount of time that is available for power-save devices, as described above with respect to scenario 300.

In the example shown in FIG. 4, device 1 and device 2 are selected for the current beacon interval. Accordingly, AP 110 sets the TIM bit in the TIM IE of the beacon frame in the TBTT for each of device 1 and device 2. As shown in FIG. 4, data transmission for both device 1 and device 2 is consummated or otherwise performed during the current beacon interval. Moreover, for the next beacon interval, device 3 and device 4 are selected and thus AP 110 will set the TIM bit for each of device 3 and device 4 for the next beacon interval.

In some implementations, the priority order for device selection may be based on one or more of the following configurable variables: a respective access category of quality of service (QOS) associated with respective buffered data destined for each of the one or more communication devices, a respective type of power-save mode in which each of the one or more communication devices is capable of operating, and a respective round robin priority for each of the one or more communication devices. In some implementations, the number or quantity of power-save devices selected may be based on either or both of the following factors: a respective last data rate of a previous data transmission to each of the one or more power-save devices, and the amount of buffered data destined for the selected number of power-save device (s).

In some implementations, deficit weighted round robin (DWRR) may be utilized in ordering the power-save devices. Each power-save device may be assigned respective values for the several configurable variables or weights. Thus, each power-save device may be associated with or otherwise assigned a respective sum of weights ($W_{sum}$) of the several weights, as expressed in the following equation:
$W_{sum} = W_{qos} + W_{psm} + W_{rr}$.

In the above equation, $W_{sum}$ denotes the total or sum of weights for the respective power-save device, $W_{qos}$ denotes the access category of QOS for the buffered data, $W_{psm}$ denotes the respective type of power-save mode, and $W_{rr}$ denotes the respective round robin priority. The power-save device with the highest weight, or largest value of $W_{sum}$, may have the highest priority. In some implementations, in an event that two or more power-save devices have the same value for $W_{sum}$, the order may be decided based on the access category of QOS of the respective buffered data of such two or more power-save devices. In an event that the access category of QOS is the same for the two or more power-save devices, the order may be determined based on a first-come-first-served basis in that the order in which the buffered data arrived in the queue of AP 110 for transmission may be used to determine the order or priority.

With respect to the weight $W_{qos}$, each access category of QOS may be assigned a respective weight value. For instance, the access category of voice (AC-VO) may be assigned the highest weight of X, the access category of video (AC-VI) may be assigned the next highest weight of X–Δx, the access category of best effort (AC-BE) may be assigned the lower weight of X–2Δx, and the access category of background (AC-BK) may be assigned the lowest weight of X–3Δx. That is, the weights of two consecutive access categories may differ by a constant differential Δx. In some implementations, for a power-save device with buffered data frames of multiple levels of QOS, the respective $W_{qos}$ may be the weight of the highest access category of QOS among the buffered data frames. For example, in an event that a power-save device has buffered data frames for AC-VO and AC-BE, then the assigned $W_{qos}$ may be X which is that for AC-VO.

With respect to the weight $W_{psm}$, a power-save device may be a non-power-save-poll or Wi-Fi multimedia (WMM). Alternatively, a power-save device may be a power-save-poll device. The value of $W_{psm}$ for non-power-save-poll/WMM devices may be Y, and the value of $W_{psm}$ for power-save-poll devices may be Y–Δy. That is, the weight differential may be Δy. In some implementations, initially when AP 110 does not have information to know which type of power-save mode in which a given power-save device may enter, AP 110 may assign the value of Y–Δy as the default value for $W_{psm}$.

With respect to the weight $W_{rr}$, each power-save device may be in one of four different states during a given beacon interval. A power-save device may be in a first state (hereinafter referred as "initial state" or "init") when AP 110 has buffered data for the power-save device. The power-save device may be in a second state (hereinafter referred as "reset state" or "reset") when the power-save device has been selected, the TIM bit is set, and the power-save device has received all the buffered data in the current beacon interval with no pending data frames. The power-save device may be in a third state (hereinafter referred as "pending state" or "pending") when the power-save device has been selected, the TIM bit is set, and the power-save device has one or more data frames still pending and not yet received. The power-save device may be in a fourth state (hereinafter referred as "waiting state" or "waiting") when the power-save device has buffered data and either (1) setting of the TIM bit is delayed or (2) the TIM bit is set but there is not sufficient time to access the transmission medium during the current beacon interval.

Under the proposed scheme, on every TBTT, the respective weight $W_{rr}$ associated with a power-save device may be revised according to the then-current state of the power-save device. For example, $W_{rr}$ may be set to a value of Z when the power-save device is in the reset or initial state. Additionally, $W_{rr}$ may be set to a value of the previous weight incremented by Δz (or $W_{rr}$(previous)+Δz) when the power-save device is in the pending state. Moreover, $W_{rr}$ may be set to a value of the previous weight incremented by 2Δz (or $W_{rr}$(previous)+2Δz) when the power-save device is in the waiting state.

Figure 5:
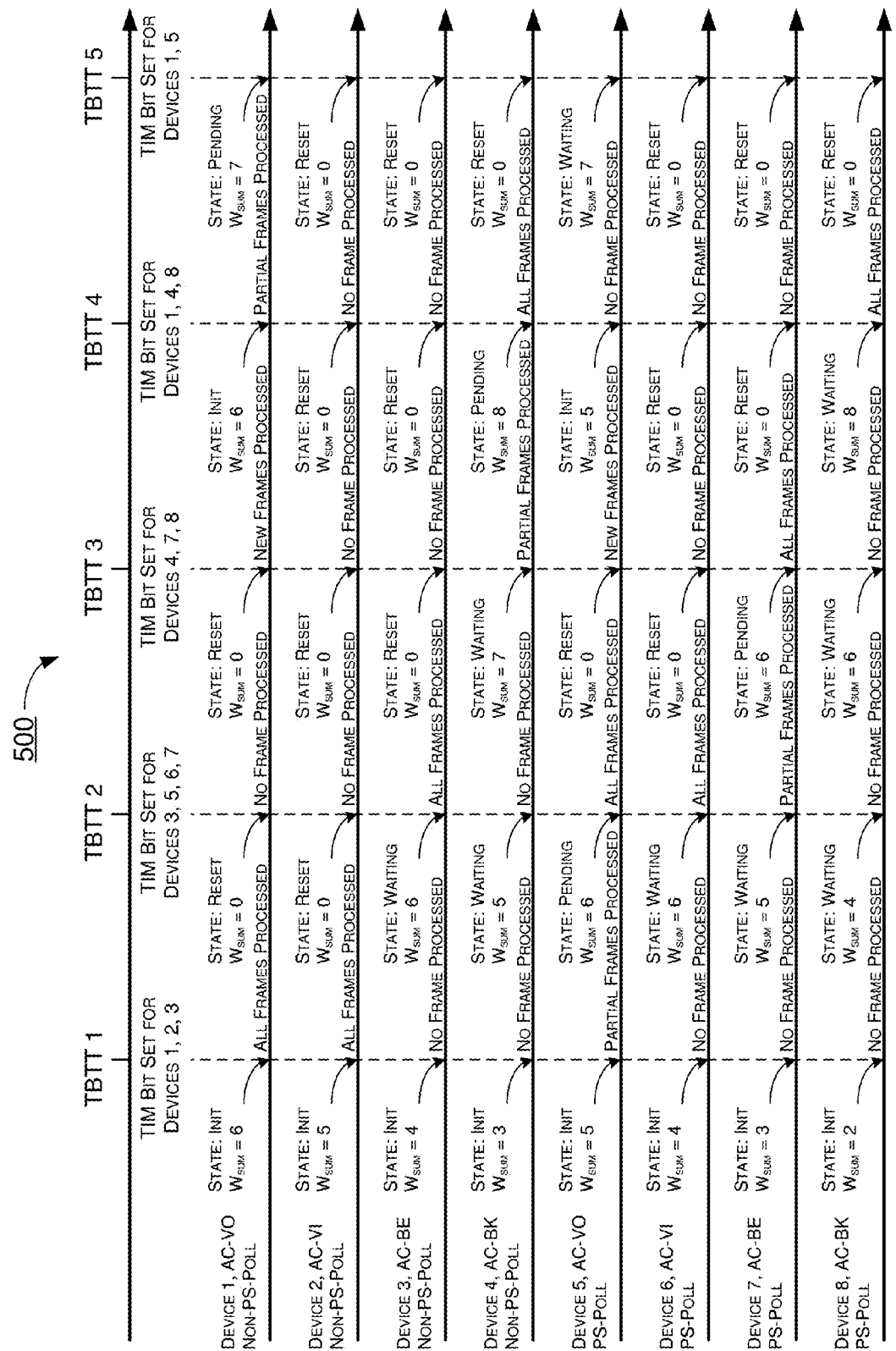
FIG. 5 is a diagram of an example scenario in accordance with an implementation of the present disclosure.

FIG. 5 illustrates an example scenario 500 in accordance with an implementation of the present disclosure. In the example shown in FIG. 5, the values of aforementioned configurable variables are set as follows: X=4, Y=2, Z=0, Δx=1, Δy=1, Δz=1. Referring to FIG. 5, for each of consecutive TBTTs such as TBTT 1, TBTT 2, TBTT 3, TBTT 4 and TBTT 5, the TIM bit corresponding to different power-save devices is set. This results in different states and different status of the buffered data frames for each of device 1, device 2, device 3, device 4, device 5, device 6, device 7 and device 8 from one TBTT to another TBTT (or, from one beacon interval to the next).

Figure 6:
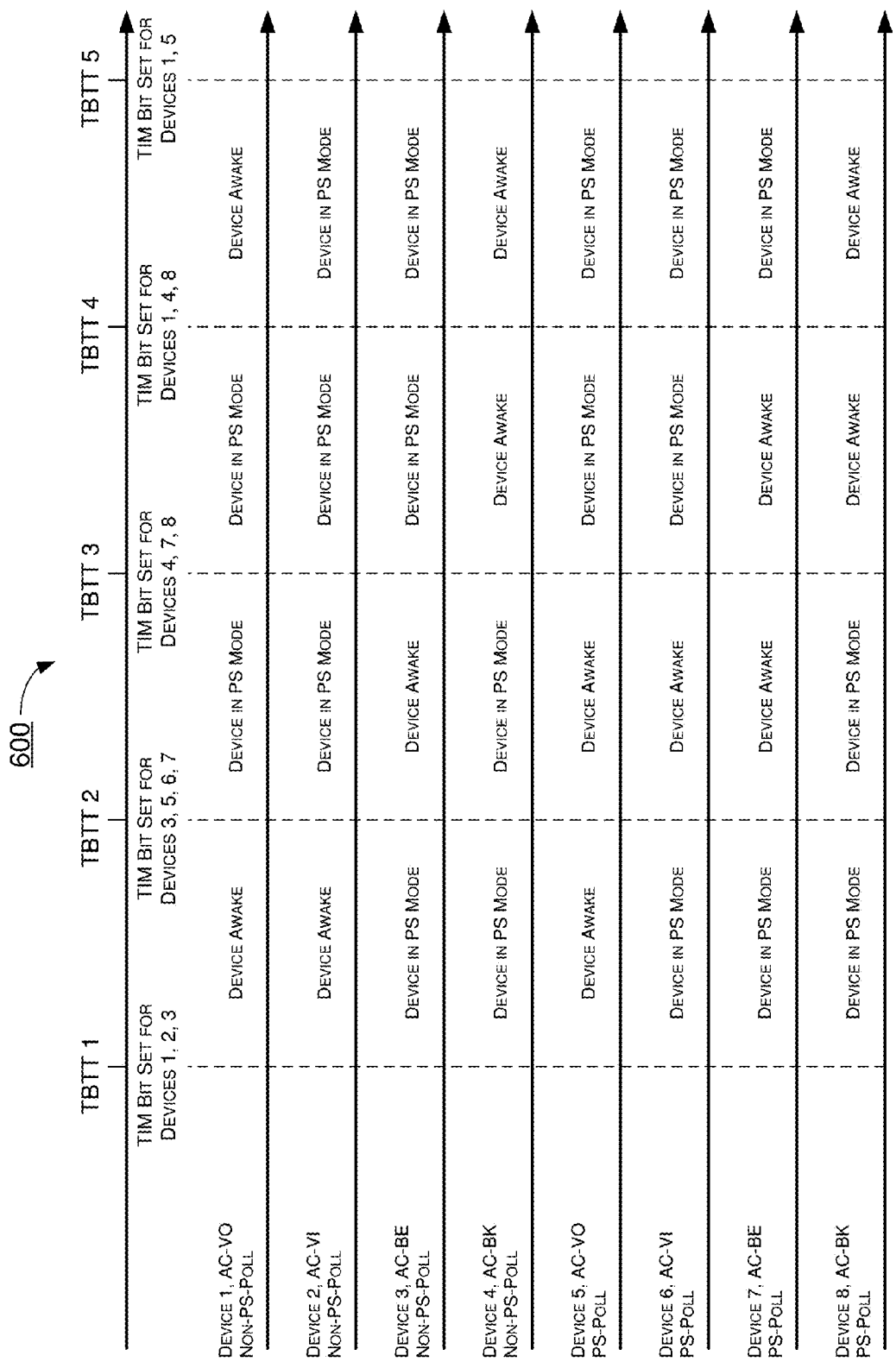
FIG. 6 is a diagram of an example scenario in accordance with an implementation of the present disclosure.

FIG. 6 illustrates an example scenario 600 in accordance with an implementation of the present disclosure. Under the proposed scheme, during each beacon interval the TIM bit is set for selected one or more power-save devices and not set for unselected one or more power-save devices. The setting of the TIM bit for an unselected power-save device with buffered data is delayed till a subsequent TBTT. In the example shown in FIG. 6, there is buffered data for each of the power-save devices of device 1, device 2, device 3, device 4, device 5, device 6, device 7 and device 8. For the eight devices and during the four beacon intervals, the total number of beacon intervals with awake device is 13 out of total 32 beacon intervals.

Figure 9:
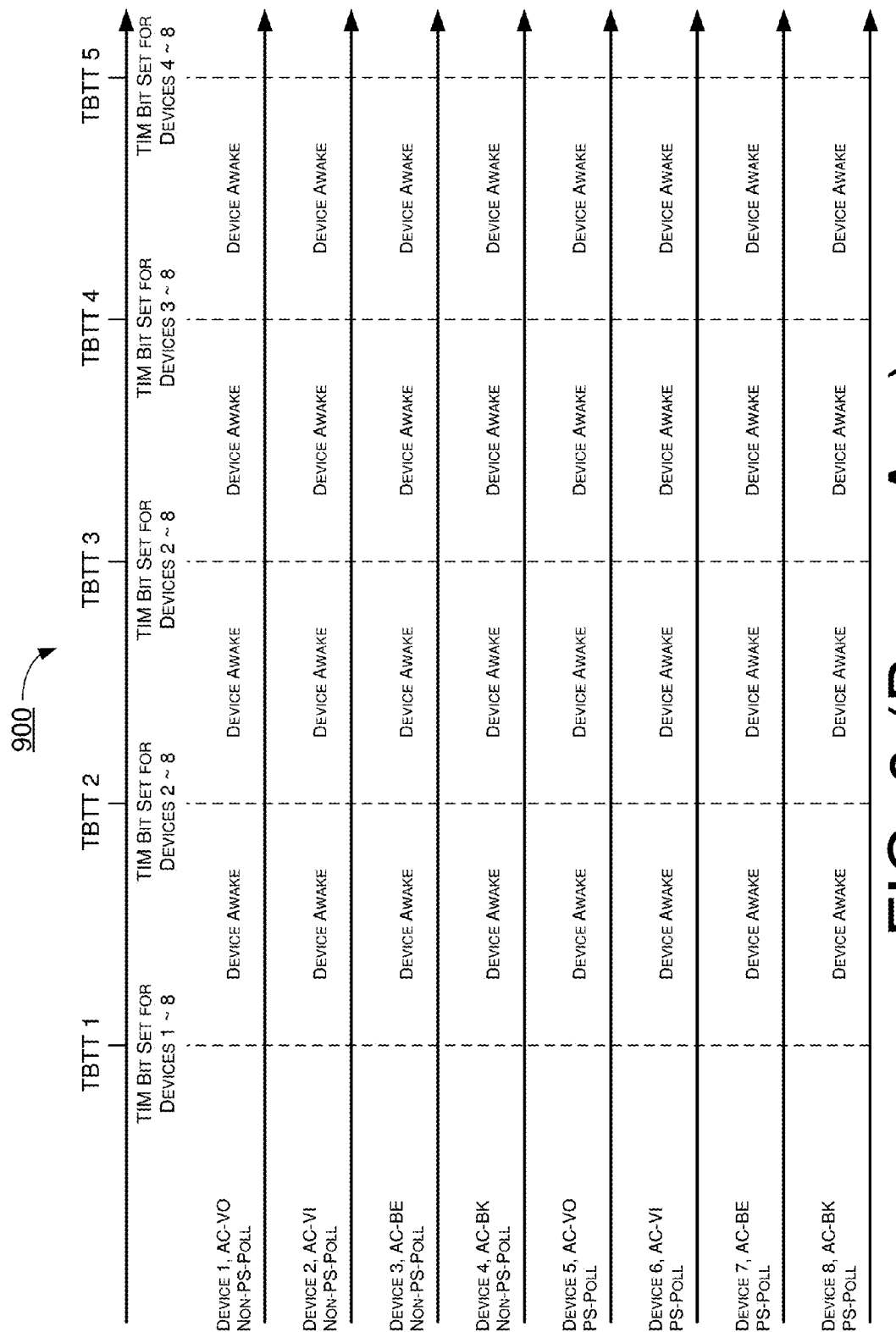
FIG. 9 is a diagram of a scenario under an existing approach.

For comparison, FIG. 9 illustrates scenario 900 under an existing approach. Under the existing approach, the TIM bit is set for each power-save device having buffered data. In the example shown in FIG. 9, it is assumed that there is buffered data for each of device 1, device 2, device 3, device 4, device 5, device 6, device 7 and device 8. For the eight devices and during the four beacon intervals, the total number of beacon intervals with awake device is 32 out of total 32 beacon intervals.

Illustrative Implementations

Figure 7:
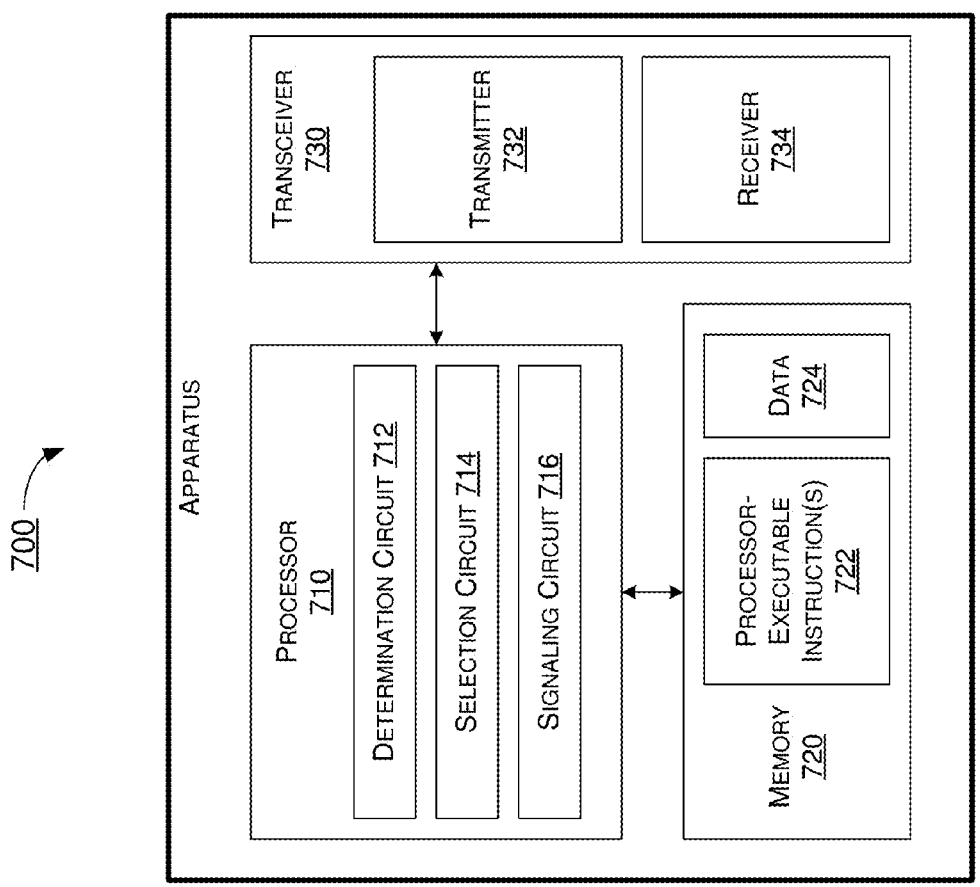
FIG. 7 is a block diagram of an example apparatus in accordance with an implementation of the present disclosure.

FIG. 7 illustrates an example apparatus 700 in accordance with an implementation of the present disclosure. Apparatus 700 may perform various functions as an access point, software-enabled access point or virtual router to implement schemes, techniques, processes and methods described herein pertaining to adaptive TIM setup policy for client devices in power-save mode in a dense environment, including networking environment 100, algorithm 200, scenario 300, scenario 400, scenario 500 and scenario 600 described above as well as process 800 described below.

Apparatus 700 may be a part of an electronic apparatus which may be a communication device, a computing apparatus, a portable or mobile apparatus, or a wearable apparatus. For instance, apparatus 700 may be implemented in a Wi-Fi access point, a smartphone, a smartwatch, a smart bracelet, a smart necklace, a personal digital assistant, or a computing device such as a tablet computer, a laptop computer, a notebook computer, a desktop computer, or a server. Alternatively, apparatus 700 may be implemented in the form of one or more integrated-circuit (IC) chips such as, for example and not limited to, one or more single-core processors, one or more multi-core processors, or one or more complex-instruction-set-computing (CISC) processors.

Apparatus 700 may include at least one, some or all of those components shown in FIG. 7. For instance, apparatus 700 may include at least a processor 710. Additionally, apparatus 700 may include a memory 720 and/or a transceiver 730 configured to transmit and receive data wirelessly (e.g., in compliance with the IEEE 802.11 specification and/or any applicable wireless protocols and standards). Each of memory 720 and transceiver 730 may be communicatively and operably coupled to processor 710. Apparatus 700 may further include other components (e.g., power system, display device and user interface device), which are not pertinent to the proposed scheme of the present disclosure and, thus, are neither shown in FIG. 7 nor described herein in the interest of simplicity and brevity.

Transceiver 730, as a communication device, may be configured to communicate wirelessly in a single frequency band or multiple frequency bands (e.g., 2.4 GHz and/or 5 GHz). Transceiver 730 may include a transmitter 732 capable of transmitting data wirelessly and a receiver 734 capable of receiving data wirelessly.

Memory 720 may be a storage device configured to store one or more sets of codes, programs and/or instructions and/or data therein. In the example shown in FIG. 7, memory 720 stores one or more sets of processor-executable instructions 722 and data 724 therein. Memory 720 may be implemented by any suitable technology and may include volatile memory and/or non-volatile memory. For example, memory 720 may include a type of random access memory (RAM) such as dynamic RAM (DRAM), static RAM (SRAM), thyristor RAM (T-RAM) and/or zero-capacitor RAM (Z-RAM). Alternatively or additionally, memory 720 may include a type of read-only memory (ROM) such as mask ROM, programmable ROM (PROM), erasable programmable ROM (EPROM) and/or electrically erasable programmable ROM (EEPROM). Alternatively or additionally, memory 720 may include a type of non-volatile random-access memory (NVRAM) such as flash memory, solid-state memory, ferroelectric RAM (FeRAM), magnetoresistive RAM (MRAM) and/or phase-change memory.

In one aspect, processor 710 may be implemented in the form of one or more single-core processors, one or more multi-core processors, or one or more CISC processors. That is, even though a singular term "a processor" is used herein to refer to processor 710, processor 710 may include multiple processors in some implementations and a single processor in other implementations in accordance with the present disclosure. In another aspect, processor 710 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, processor 710 is a special-purpose machine specifically designed, arranged and configured to perform specific tasks including adaptive TIM setup policy for client devices in power-save mode in a dense environment in accordance with various implementations of the present disclosure.

Processor 710, as a special-purpose machine, may include non-generic and specially-designed hardware circuits that are designed, arranged and configured to perform specific tasks pertaining to power-save operations for access points in accordance with various implementations of the present disclosure. In one aspect, processor 710 may execute the one or more sets of codes, programs and/or instructions 722 stored in memory 720 to perform various operations to render power-save operations in accordance with various implementations of the present disclosure. In another aspect, processor 710 may include a determination circuit 712, a selection circuit 714 and a signaling circuit 716 that, together, perform specific tasks and functions to render power-save operations for access points in accordance with various implementations of the present disclosure.

The following description is applicable to implementations in which apparatus 700 functions as an access point (e.g., AP 110 in networking environment 100).

In one aspect, determination circuit 712 may determine an amount of available time for access to a transmission medium (e.g., by sensing the transmission medium via transceiver 730). Selection circuit 714 may select a subset of one or more communication devices from a plurality of communication devices associated with the apparatus based at least in part on the amount of available time. Signaling circuit 716 may signal, via transceiver 730, to the selected subset of the one or more communication devices to cause the one or more communication devices to switch from a first mode to a second mode. In another aspect, processor 710 may access the one or more sets of processor-executable instructions 722 such that, upon execution of the one or more sets of instructions 722, processor may perform the aforementioned and below-described operations.

In some implementations, in determining the amount of available time, processor 710 may perform a number of acts. For instance, determination circuit 712 may sense the transmission medium for a predetermined period of time. Determination circuit 712 may also determine an amount of overlapping basic service set (OBSS) time based on a result of the sensing. Determination circuit 712 may further subtract the OBSS time from a beacon interval between two adjacent TBTTs to obtain the amount of available time.

In some implementations, in selecting the subset of the one or more communication devices, processor 710 may perform a number of acts. For instance, selection circuit 714 may prioritize the one or more communication devices to provide a list of the one or more communication devices in a descending order of priority based on a number of selection factors. Additionally, selection circuit 714 may determine a number of the one or more communication devices to be selected based at least in part on the amount of available time. Moreover, selection circuit 714 may select the determined number of the one or more communication devices from top of the list.

In some implementations, in prioritizing the one or more communication devices based on the number of selection factors, processor 710 may perform a number of acts. For instance, selection circuit 714 may assign a first weight related to a respective access category of quality of service (QOS) associated with respective buffered data destined for each of the one or more communication devices. Selection circuit 714 may also assign a second weight related to a respective type of power-save mode in which each of the one or more communication devices is capable of operating. Additionally, selection circuit 714 may assign a third weight related to a respective round robin priority for each of the one or more communication devices. Moreover, selection circuit 714 may sum the first weight, the second weight and the third weight to yield a respective combined weight for each of the one or more communication devices. Furthermore, selection circuit 714 may rank the one or more communication devices according to the respective combined weight of each of the one or more communication devices.

In some implementations, in determining the number of the one or more communication devices to be selected, processor 710 may perform a number of acts. For instance, selection circuit 714 may determine a respective last data rate of a previous data transmission to each of the one or more communication devices. Additionally, processor 710 may perform a number of acts. For instance, selection circuit 714 may determine a respective amount of buffered data destined for each of the one or more communication devices. Moreover, selection circuit 714 may determine the number of the one or more communication devices for transmission of the respective buffered data within a current beacon interval during the available time based on the amount of available time, the respective last data rate of each of the one or more communication devices, and the respective amount of buffered data destined for each of the one or more communication devices.

In some implementations, processor 710 may transmit, via transceiver 730, buffered data to at least one communication device of the subset of one or more communication devices during the available time. In signaling to the selected subset of the one or more communication devices to cause the one or more communication devices to switch from the first mode to the second mode, processor 710 may perform a number of acts. For instance, processor 710 may set a TIM bit in a TIM information element (IE) of a beacon frame for at least a first communication device of the one or more communication devices in the subset. Additionally, processor 710 may transmit, via transceiver 730, the beacon frame with the TIM bit set in the TIM IE for at least the first communication device at a current TBTT. Moreover, processor 710 may delay, until a subsequent TBTT, the setting of the TIM bit in the TIM IE of a beacon frame for at least a second communication device of the one or more communication devices in the subset. In such cases, there may be sufficient time to transmit all buffered data destined for the first communication device during a current beacon interval. Furthermore, there may be insufficient time to transmit all buffered data destined for the second communication device during the current beacon interval.

Figure 8:
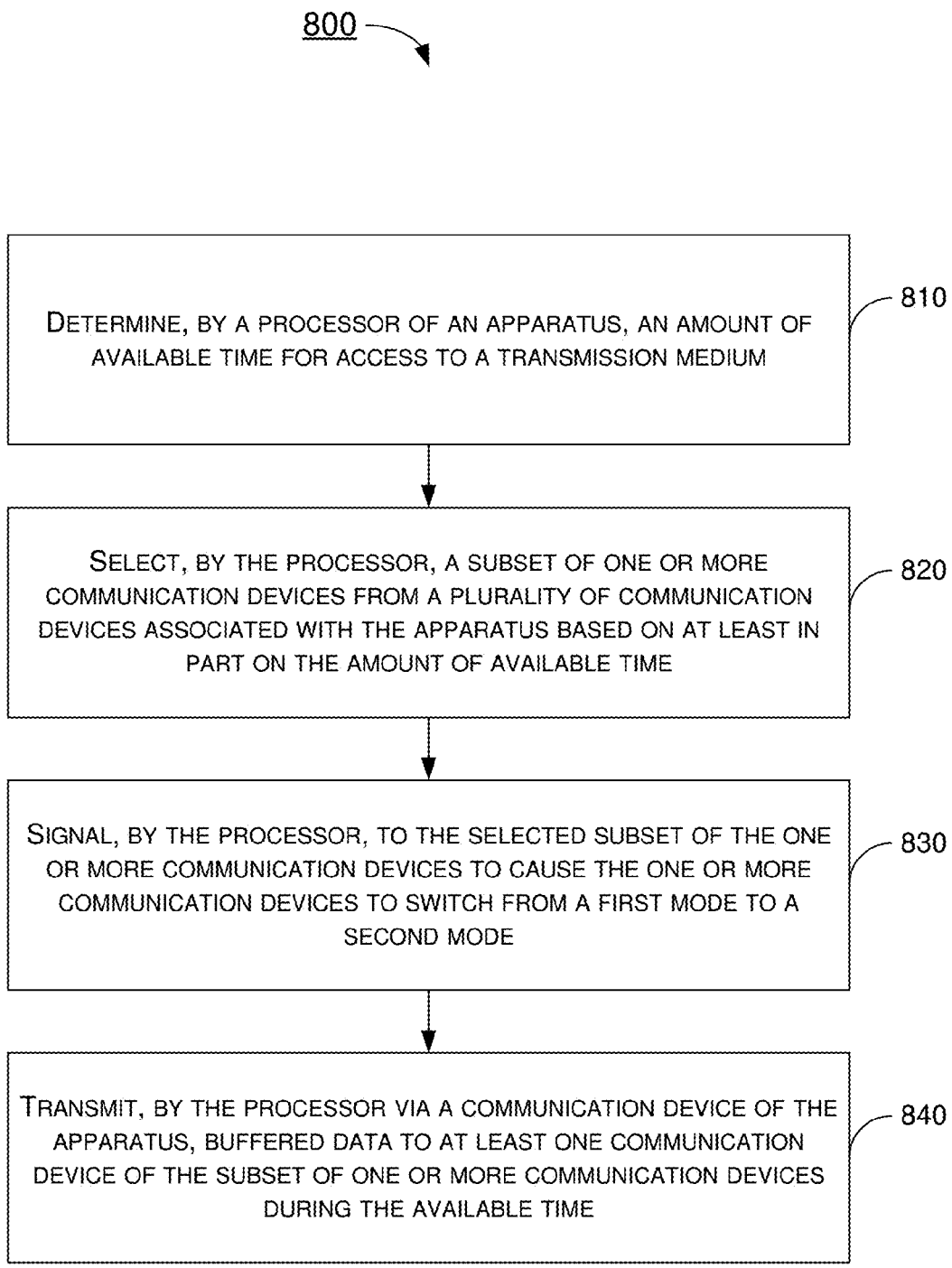
FIG. 8 is a flowchart of an example process in accordance with an implementation of the present disclosure.

FIG. 8 illustrates an example process 800 in accordance with an implementation of the present disclosure. Process 800 may represent an aspect of implementing the proposed scheme in networking environment 100. Alternatively or additionally, process 800 may represent an aspect of implementing the proposed scheme in the context of algorithm 200, scenario 300, scenario 400, scenario 500 and/or scenario 600. Process 800 may include one or more operations, actions, or functions as illustrated by one or more of blocks 810, 820, 830 and 840. Although illustrated as discrete blocks, various blocks of process 800 may be divided into additional blocks, combined into fewer blocks, or eliminated, depending on the desired implementation. Moreover, the blocks/sub-blocks of process 800 may executed in the order shown in FIG. 8 or, alternatively in a different order. Process 800 may be implemented by apparatus 700 and any variations thereof, which may be an access point, a software-enabled access point, or a virtual router. For instance, process 800 may be implemented in or by apparatus 700 functioning as access point AP 110 in networking environment 100. Solely for illustrative purposes and without limiting the scope, process 800 is described below in the context of apparatus 700 being an access point. Process 800 may begin at block 810.

At 810, process 800 may involve processor 710 of apparatus 700 determining an amount of available time for access to a transmission medium. Process 800 may proceed from 810 to 820.

At 820, process 800 may involve processor 710 selecting a subset of one or more communication devices from a plurality of communication devices (e.g., communication devices 120(1)-120(N) which are in a WLAN associated with apparatus 700 as the AP) based at least in part on the amount of available time. Process 800 may proceed from 820 to 830.

At 830, process 800 may involve processor 710 signaling to the selected subset of the one or more communication devices to cause the one or more communication devices to switch from a first mode to a second mode (e.g., to switching from being asleep, such as being in power-save mode, to being awake, such as being in normal operation mode). Process 800 may proceed from 830 to 840.

At 840, process 800 may involve processor 710 transmitting, via a communication device of apparatus 700 (e.g., transceiver 730), buffered data to at least one communication device of the subset of one or more communication devices during the available time.

In some implementations, in determining the amount of available time, process 800 may involve processor 710 performing a number of operations. For instance, process 800 may involve processor 710 sensing, via transceiver 730, the transmission medium for a predetermined period of time. Process 800 may also involve processor 710 determining an amount of OBSS time based on a result of the sensing. Process 800 may further involve processor 710 subtracting the OBSS time from a beacon interval between two adjacent TBTTs to obtain the amount of available time.

In some implementations, in selecting the subset of the one or more communication devices, process 800 may involve processor 710 performing a number of operations. For instance, process 800 may involve processor 710 prioritizing the one or more communication devices to provide a list of the one or more communication devices in a descending order of priority based on a number of selection factors. Process 800 may also involve processor 710 determining a number of the one or more communication devices to be selected based at least in part on the amount of available time. Process 800 may further involve processor 710 selecting the determined number of the one or more communication devices from top of the list.

In some implementations, in prioritizing the one or more communication devices based on the number of selection factors, process 800 may involve processor 710 performing a number of operations. For instance, process 800 may involve processor 710 assigning a first weight related to a respective access category of QOS associated with respective buffered data destined for each of the one or more communication devices. Additionally, process 800 may involve processor 710 assigning a second weight related to a respective type of power-save mode in which each of the one or more communication devices is capable of operating. Process 800 may also involve processor 710 assigning a third weight related to a respective round robin priority for each of the one or more communication devices. Moreover, process 800 may involve processor 710 summing the first weight, the second weight and the third weight to yield a respective combined weight for each of the one or more communication devices. Furthermore, process 800 may involve processor 710 ranking the one or more communication devices according to the respective combined weight of each of the one or more communication devices.

In some implementations, in ranking the one or more communication devices according to the respective combined weight of each of the one or more communication devices, process 800 may involve processor 710 ranking a first communication device of the one or more communication devices higher than a second communication device of the one or more communication devices responsive to the following: (1) the respective combined weight for the first communication device and the respective combined weight for the second communication device being equal, and (2) the respective access category of QOS associated with respective buffered data destined for the first communication device being higher than the respective access category of QOS associated with respective buffered data destined for the second communication device. Likewise, process 800 may involve processor 710 ranking the second communication device of the one or more communication devices higher than a third communication device of the one or more communication devices responsive to the following: (1) the respective combined weight for the second communication device and the respective combined weight for the third communication device being equal, and (2) the respective access category of QOS associated with respective buffered data destined for the second communication device being higher than the respective access category of QOS associated with respective buffered data destined for the third communication device.

Additionally, in ranking the one or more communication devices according to the respective combined weight of each of the one or more communication devices, process 800 may involve processor 710 ranking the first communication device higher than the second communication device responsive to the following: (1) the respective access category of QOS associated with respective buffered data destined for the first communication device and the respective access category of QOS associated with respective buffered data destined for the second communication device being equal, and (2) a time of the respective buffered data destined for the first communication device being higher arriving in a queue being earlier than a time of the respective buffered data destined for the second communication device arriving in the queue. Similarly, process 800 may involve processor 710 ranking the second communication device higher than the third communication device responsive to the following: (1) the respective access category of QOS associated with respective buffered data destined for the second communication device and the respective access category of QOS associated with respective buffered data destined for the third communication device being equal, and (2) a time of the respective buffered data destined for the second communication device being higher arriving in a queue being earlier than a time of the respective buffered data destined for the third communication device arriving in the queue.

In some implementations, in assigning the first weight related to the respective access category of 00S associated with respective buffered data destined for each of the one or more communication devices, process 800 may involve processor 710 performing a number of operations. For instance, process 800 may involve processor 710 assigning a first value for the first weight responsive to the respective access category of QOS being voice. Additionally, process 800 may involve processor 710 assigning a second value for the first weight responsive to the respective access category of QOS being video. Moreover, process 800 may involve processor 710 assigning a third value for the first weight responsive to the respective access category of QOS being best effort. Furthermore, process 800 may involve processor 710 assigning a fourth value for the first weight responsive to the respective access category of QOS being background. In such cases, the first value may be greater than the second value, which may be greater than the third value, which may be greater than the fourth value.

In some implementations, in assigning the first weight related to the respective access category of QOS associated with respective buffered data destined for each of the one or more communication devices, process 800 may also involve processor 710 assigning one of the first value, second value, third value and fourth value for the first weight corresponding to one of multiple access categories having a highest QOS requirement among the multiple access categories associated with multiple types of data when the multiple types of data exist in the buffered data.

In some implementations, in assigning the second weight related to the respective type of power-save mode in which each of the one or more communication devices is capable of operating, process 800 may involve processor 710 performing a number of operations. For instance, process 800 may involve processor 710 assigning a first value for the second weight responsive to the respective communication device being a non-power-save-poll device. Additionally, process 800 may involve processor 710 assigning the first value for the second weight responsive to the respective communication device being a Wi-Fi multimedia (WMM) power-save device. Moreover, process 800 may involve processor 710 assigning a second value for the second weight responsive to the respective communication device being a power-save-poll device. Furthermore, process 800 may involve processor 710 assigning the second value for the second weight responsive to lack of information on the respective type of power-save mode in which the respective communication device is capable of operating. In such cases, the first value may be greater than the second value.

In some implementations, in assigning the third weight related to the respective round robin priority for each of the one or more communication devices, process 800 may involve processor 710 performing a number of operations. For instance, process 800 may involve processor 710 assigning an initial value for the third weight responsive to the respective communication device being in a first state in which there is buffered data destined for the respective communication device. Additionally, process 800 may involve processor 710 assigning the initial value for the third weight responsive to the respective communication device being in a second state in which the respective communication device has been selected, a respective TIM bit is set in a beacon frame for the respective communication device, and the respective communication device has received all buffered data destined for the respective communication device within a current beacon interval. Moreover, process 800 may involve processor 710 assigning a previous weight plus a first value for the third weight responsive to the respective communication device being in a third state in which the respective communication device has been selected, the respective TIM bit is set in the beacon frame for the respective communication device, and the respective communication device has received some but not all buffered data destined for the respective communication device within the current beacon interval. Furthermore, process 800 may involve processor 710 assigning the previous weight plus a second value for the third weight responsive to the respective communication device being in a fourth state in which the respective communication device has been selected and either the respective TIM bit is not set or the TIM bit is set but there is not sufficient time for medium access in the current beacon interval. In such cases, the first value may be less than the second value.

In some implementations, in determining the number of the one or more communication devices to be selected, process 800 may involve processor 710 determining a respective last data rate of a previous data transmission to each of the one or more communication devices. Process 800 may also involve processor 710 determining a respective amount of buffered data destined for each of the one or more communication devices. Process 800 may further involve processor 710 determining the number of the one or more communication devices for transmission of the respective buffered data within a current beacon interval during the available time based on the amount of available time, the respective last data rate of each of the one or more communication devices, and the respective amount of buffered data destined for each of the one or more communication devices.

In some implementations, in signaling the selected subset of the one or more communication devices to cause the one or more communication devices to switch from the first mode to the second mode, process 800 may involve processor 710 performing a number of operations. For instance, process 800 may involve processor 710 setting a TIM bit in a TIM IE of a beacon frame for at least a first communication device of the one or more communication devices in the subset. Additionally, process 800 may involve processor 710 transmitting the beacon frame with the TIM bit set in the TIM IE for at least the first communication device at a current TBTT. In such cases, there may be sufficient time to transmit all buffered data destined for the first communication device during a current beacon interval.

Additionally, in signaling to the selected subset of the one or more communication devices to cause the one or more communication devices to switch from the first mode to the second mode, process 800 may also involve processor 710 delaying, until a subsequent TBTT, the setting of the TIM bit in the TIM IE of a beacon frame for at least a second communication device of the one or more communication devices in the subset. In such cases, there may be insufficient time to transmit all buffered data destined for the second communication device during the current beacon interval.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   determining, by a processor of an apparatus, an amount of available time for access to a transmission medium;
   selecting, by the processor, a subset of one or more communication devices from a plurality of communication devices associated with the apparatus based at least in part on the amount of available time; and
   signaling, by the processor, to the selected subset of the one or more communication devices to cause the one or more communication devices to switch from a first mode to a second mode,
   wherein the determining of the amount of available time comprises:
   sensing the transmission medium for a predetermined period of time;

determining an amount of overlapping basic service set (OBSS) time based on a result of the sensing; and subtracting the OBSS time from a beacon interval between two adjacent target beacon transmission times (TBTTs) to obtain the amount of available time.

2. The method of claim 1, wherein the selecting of the subset of the one or more communication devices comprises:

prioritizing the one or more communication devices to provide a list of the one or more communication devices in a descending order of priority based on a number of selection factors;

determining a number of the one or more communication devices to be selected based at least in part on the amount of available time; and selecting the determined number of the one or more communication devices from top of the list.

3. The method of claim 2, wherein the prioritizing of the one or more communication devices based on the number of selection factors comprises:

assigning a first weight related to a respective access category of quality of service (QOS) associated with respective buffered data destined for each of the one or more communication devices;

assigning a second weight related to a respective type of power-save mode in which each of the one or more communication devices is capable of operating;

assigning a third weight related to a respective round robin priority for each of the one or more communication devices;

summing the first weight, the second weight and the third weight to yield a respective combined weight for each of the one or more communication devices; and ranking the one or more communication devices according to the respective combined weight of each of the one or more communication devices.

4. The method of claim 3, wherein the ranking of the one or more communication devices according to the respective combined weight of each of the one or more communication devices comprises:

ranking a first communication device of the one or more communication devices higher than a second communication device of the one or more communication devices responsive to:

the respective combined weight for the first communication device and the respective combined weight for the second communication device being equal, and the respective access category of QOS associated with respective buffered data destined for the first communication device being higher than the respective access category of QOS associated with respective buffered data destined for the second communication device.

5. The method of claim 4, wherein the ranking of the one or more communication devices according to the respective combined weight of each of the one or more communication devices further comprises:

ranking the first communication device higher than the second communication device responsive to:

the respective access category of QOS associated with respective buffered data destined for the first communication device and the respective access category of QOS associated with respective buffered data destined for the second communication device being equal, and a time of the respective buffered data destined for the first communication device being higher arriving in a queue being earlier than a time of the respective buffered data destined for the second communication device arriving in the queue.

6. The method of claim 3, wherein the assigning of the first weight related to the respective access category of QOS associated with respective buffered data destined for each of the one or more communication devices comprises:

assigning a first value for the first weight responsive to the respective access category of QOS being voice;

assigning a second value for the first weight responsive to the respective access category of QOS being video;

assigning a third value for the first weight responsive to the respective access category of QOS being best effort; and assigning a fourth value for the first weight responsive to the respective access category of QOS being background, wherein the first value is greater than the second value which is greater than the third value which is greater than the fourth value.

7. The method of claim 6, wherein the assigning of the first weight related to the respective access category of QOS associated with respective buffered data destined for each of the one or more communication devices further comprises:

assigning one of the first value, second value, third value and fourth value for the first weight corresponding to one of multiple access categories having a highest QOS requirement among the multiple access categories associated with multiple types of data when the multiple types of data exist in the buffered data.

8. The method of claim 3, wherein the assigning of the second weight related to the respective type of power-save mode in which each of the one or more communication devices is capable of operating comprises:

assigning a first value for the second weight responsive to the respective communication device being a non-power-save-poll device;

assigning the first value for the second weight responsive to the respective communication device being a Wi-Fi multimedia (WMM) power-save device;

assigning a second value for the second weight responsive to the respective communication device being a power-save-poll device; and assigning the second value for the second weight responsive to lack of information on the respective type of power-save mode in which the respective communication device is capable of operating, wherein the first value is greater than the second value.

9. The method of claim 3, wherein the assigning of the third weight related to the respective round robin priority for each of the one or more communication devices comprises:

assigning an initial value for the third weight responsive to the respective communication device being in a first state in which there is buffered data destined for the respective communication device;

assigning the initial value for the third weight responsive to the respective communication device being in a second state in which the respective communication device has been selected, a respective traffic indication map (TIM) bit is set in a beacon frame for the respective communication device, and the respective communication device has received all buffered data destined for the respective communication device within a current beacon interval;

assigning a previous weight plus a first value for the third weight responsive to the respective communication device being in a third state in which the respective communication device has been selected, the respective TIM bit is set in the beacon frame for the respective communication device, and the respective communication device has received some but not all buffered data destined for the respective communication device within the current beacon interval; and assigning the previous weight plus a second value for the third weight responsive to the respective communication device being in a fourth state in which the respective communication device has been selected and either the respective TIM bit is not set or the TIM bit is set but there is not sufficient time for medium access in the current beacon interval, wherein the first value is less than the second value.

10. The method of claim 2, wherein the determining of the number of the one or more communication devices to be selected comprises:

determining a respective last data rate of a previous data transmission to each of the one or more communication devices;

determining a respective amount of buffered data destined for each of the one or more communication devices; and determining the number of the one or more communication devices for transmission of the respective buffered data within a current beacon interval during the available time based on the amount of available time, the respective last data rate of each of the one or more communication devices, and the respective amount of buffered data destined for each of the one or more communication devices.

11. The method of claim 1, wherein the signaling to the selected subset of the one or more communication devices to cause the one or more communication devices to switch from the first mode to the second mode comprises:

setting a traffic indication map (TIM) bit in a TIM information element (IE) of a beacon frame for at least a first communication device of the one or more communication devices in the subset; and transmitting the beacon frame with the TIM bit set in the TIM IE for at least the first communication device at a current target beacon transmission time (TBTT), wherein there is sufficient time to transmit all buffered data destined for the first communication device during a current beacon interval.

12. The method of claim 11, wherein the signaling to the selected subset of the one or more communication devices to cause the one or more communication devices to switch from the first mode to the second mode further comprises:

delaying, until a subsequent TBTT, the setting of the TIM bit in the TIM IE of a beacon frame for at least a second communication device of the one or more communication devices in the subset, wherein there is insufficient time to transmit all buffered data destined for the second communication device during the current beacon interval.

13. The method of claim 1, further comprising:

transmitting, by the processor via a communication device of the apparatus, buffered data to at least one communication device of the subset of one or more communication devices during the available time.

14. An apparatus, comprising:

a memory that stores one or more sets of instructions; and a processor communicatively coupled to the memory to execute the one or more sets of instructions such that, upon execution of the one or more sets of instructions, the processor performs acts comprising:

determining an amount of available time for access to a transmission medium;

selecting a subset of one or more communication devices from a plurality of communication devices associated with the apparatus based at least in part on the amount of available time; and signaling to the selected subset of the one or more communication devices to cause the one or more communication devices to switch from a first mode to a second mode, wherein, in selecting the subset of the one or more communication devices, the processor performs acts comprising:

prioritizing the one or more communication devices to provide a list of the one or more communication devices in a descending order of priority based on a number of selection factors;

determining a number of the one or more communication devices to be selected based at least in part on the amount of available time; and selecting the determined number of the one or more communication devices from top of the list.

15. The apparatus of claim 14, wherein, in determining the amount of available time, the processor performs acts comprising:

sensing the transmission medium for a predetermined period of time;

determining an amount of overlapping basic service set (OBSS) time based on a result of the sensing; and subtracting the OBSS time from a beacon interval between two adjacent target beacon transmission times (TBTTs) to obtain the amount of available time.

16. The apparatus of claim 14, wherein, in prioritizing the one or more communication devices based on the number of selection factors, the processor performs acts comprising:

assigning a first weight related to a respective access category of quality of service (QOS) associated with respective buffered data destined for each of the one or more communication devices;

assigning a second weight related to a respective type of power-save mode in which each of the one or more communication devices is capable of operating;

assigning a third weight related to a respective round robin priority for each of the one or more communication devices;

summing the first weight, the second weight and the third weight to yield a respective combined weight for each of the one or more communication devices; and ranking the one or more communication devices according to the respective combined weight of each of the one or more communication devices.

17. The apparatus of claim 14, wherein, in determining the number of the one or more communication devices to be selected, the processor performs acts comprising:

determining a respective last data rate of a previous data transmission to each of the one or more communication devices;

determining a respective amount of buffered data destined for each of the one or more communication devices; and determining the number of the one or more communication devices for transmission of the respective buffered data within a current beacon interval during the available time based on the amount of available time, the respective last data rate of each of the one or more communication devices, and the respective amount of buffered data destined for each of the one or more communication devices.

18. The apparatus of claim 14, further comprising:

a communication device coupled to and controlled by the processor, wherein the processor transmits, via the communication device, buffered data to at least one communication device of the subset of one or more communication devices during the available time, and wherein, in signaling to the selected subset of the one or more communication devices to cause the one or more communication devices to switch from the first mode to the second mode, the processor performs acts comprising setting a traffic indication map (TIM) bit in a TIM information element (IE) of a beacon frame for at least a first communication device of the one or more communication devices in the subset;

transmitting, via the communication device, the beacon frame with the TIM bit set in the TIM IE for at least the first communication device at a current target beacon transmission time (TBTT); and delaying, until a subsequent TBTT, the setting of the TIM bit in the TIM IE of a beacon frame for at least a second communication device of the one or more communication devices in the subset, wherein there is sufficient time to transmit all buffered data destined for the first communication device during a current beacon interval, and wherein there is insufficient time to transmit all buffered data destined for the second communication device during the current beacon interval.

\* \* \* \* \*